United States Patent [19]

Fakler et al.

[11] Patent Number: 5,053,658

[45] Date of Patent: Oct. 1, 1991

[54] ELECTRICAL MACHINE, SUCH AS ROTARY CURRENT GENERATOR, HAVING IMPROVED COOLING

[75] Inventors: Bernhard Fakler, Esselingen; Martin Müller, Ludwigsburg; Pflüger; Klaus-Georg Bürger, both of Markgroeningen; Kurt Weisserth, Vaihingenenz, all of Fed. Rep. of Germany

[73] Assignee: Robert Bosch GmbH, Stuttgart, Fed. Rep. of Germany

[21] Appl. No.: 527,086

[22] Filed: May 21, 1990

[30] Foreign Application Priority Data

Jul. 8, 1989 [DE] Fed. Rep. of Germany ....... 3922537
Dec. 23, 1989 [DE] Fed. Rep. of Germany ....... 3942768

[51] Int. Cl.$^5$ .............................................. H02K 5/18
[52] U.S. Cl. ........................................ 310/64; 310/45; 310/42
[58] Field of Search ................. 310/64, 257, 42, 44, 310/45, 263

[56] References Cited

U.S. PATENT DOCUMENTS

| | | | |
|---|---|---|---|
| 3,688,137 | 8/1972 | Filhol | 310/43 |
| 4,381,465 | 4/1983 | Renkl et al. | 310/257 |
| 4,492,884 | 1/1985 | Asano et al. | 310/45 |
| 4,634,908 | 1/1987 | Sturm | 310/64 |
| 4,651,039 | 3/1987 | Yamamoto et al. | 310/45 |
| 4,876,470 | 10/1989 | Geller | 310/59 |

Primary Examiner—Steven L. Stephan
Assistant Examiner—Edward H. To
Attorney, Agent, or Firm—Michael J. Striker

[57] ABSTRACT

An electrical machine, particularly a rotary current generator, has a stator, a claw pole rotor, a stator winding having winding heads extending outwardly beyond ends of the surface-cooled stator, a metal housing surrounding the stator and serving for withdrawal of heat from an interior to an exterior of the housing, a zinc die cast alloy in which the winding heads are electrically insulatingly embedded and which conduct heat to the metal housing, and an electrically insulating layer completely coating each of the winding heads and located between each of the winding heads and the zinc die cast alloy.

5 Claims, 2 Drawing Sheets

ELECTRICAL MACHINE, SUCH AS ROTARY CURRENT GENERATOR, HAVING IMPROVED COOLING

BACKGROUND OF THE INVENTION

The present invention relates to an electrical machine, for example, a rotary current generator for power vehicles. More particularly, it relates to such an electrical machine which has a stator which is surface cooled, a claw pole rotor, a stator winding supported by a stator sheet pack and having winding heads extending outwardly beyond the stator sheet pack, a metal housing through which heat is withdrawn from its outer surface by a cooling medium, and a heat conductive material embedding the winding heads and connected with metal housing in a heat conductive manner.

Electrical machines of the above mentioned general type are known in the art. In one of such electrical machines disclosed, for example in the JA-GM 57-65570, in which the stator housing of an electric motor is provided with cooling ribs for heat withdrawal. Together with the ring-shaped spaces on the winding heads of the stator winding, the cooling ribs are filled with a heat-conductive mold resin. The winding heads are completely embedded in the mold resin.

Patent document CH-PS 317,647 discloses electrical machines in which outer gaps of a stator-sheet pack together with the winding heads of the stator winding are cast out or cast around by a casting mass of cast resin or the like. The materials for embedding of the winding heads which are used here provide for a good protection against mechanical damage to the winding heads from outside. However, their cooling properties are unsatisfactory because of unfavorable heat conductive values. Moreover, the resin which is utilized here has a tendency to form air inclusions during hardening, due to relatively high shrinkage.

SUMMARY OF THE INVENTION

Accordingly, it is an object of the present invention to provide an electrical machine of the above mentioned general type, which avoids the disadvantages of the prior art.

More particularly, it is an object of the present invention to provide an electrical machine in which the heat withdrawal from the winding heads outwardly is further improved in a cost-favorable manner.

In keeping with these objects and with others which will become apparent hereinafter, one feature of the present invention resides, briefly stated, in that the winding heads are first completely coated with an electrical insulating layer and then embedded in a heat conductor material, such as metal die cast alloy.

When the electrical machine is designed in accordance with the present invention it achieves the above mentioned objects and avoids the disadvantages of the prior art. The metal die cast alloy has high heat conductive value. Therefore the heat generated in the winding heads reaches the metal die cast alloy almost immediately through the relatively thin insulating layer, and then can be rapidly transferred through the outer surface of the stator housing from the metal die cast alloy.

A further advantage is that the shrinkage ratio determined by the metal die cast alloy relative to the casting masses is practically negligible so that air inclusions between the insulating layer of the winding heads and the metal die cast alloy are avoided. Moreover, the insulating layer which completely coats the winding heads prevents a damage to the winding heads by the casting of the metal die cast alloy.

In accordance with another feature of the present invention, the heat conductive material is connected on its outer periphery with the metal housing over a plane or in other words flatly. Here, the embedding of the winding heads and the metal housing for the stator of the electrical machine is performed in one working step by the metal die cast alloy. In addition to high heat withdrawal from the winding heads, also a significant cost saving during the manufacture of the electrical machine is obtained.

In accordance with a further especially advantageous feature of the present invention, a zinc alloy is used as the metal die cast alloy. This material has both the properties required for the housing material, and also a low vibration property, as well as a relatively low temperature during casting, so that no damages to the stator windings occur.

The electrical insulating layer of the winding heads is composed in an advantageous manner from a sufficiently temperature resistant impregnating resin. Advantageously, the wound stator sheet pack with the winding heads is first dipped in a liquid impregnating resin. The embedding of the winding heads into the metal die cast alloy is performed after the impregnating resin has been hardened.

An enclosed insulating layer which completely coats the winding heads can also be obtained in an advantageous manner when the winding heads are immersed in heated synthetic plastic powder. The synthetic plastic powder firmly adheres to the outer surface of the winding heads, and the synthetic plastic powder is melted or sintered to form a closed synthetic plastic layer with a thickness of approximately 0.5-1.0 mm. This process is known as fluidized bed sintering and is especially environmentally favorable.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
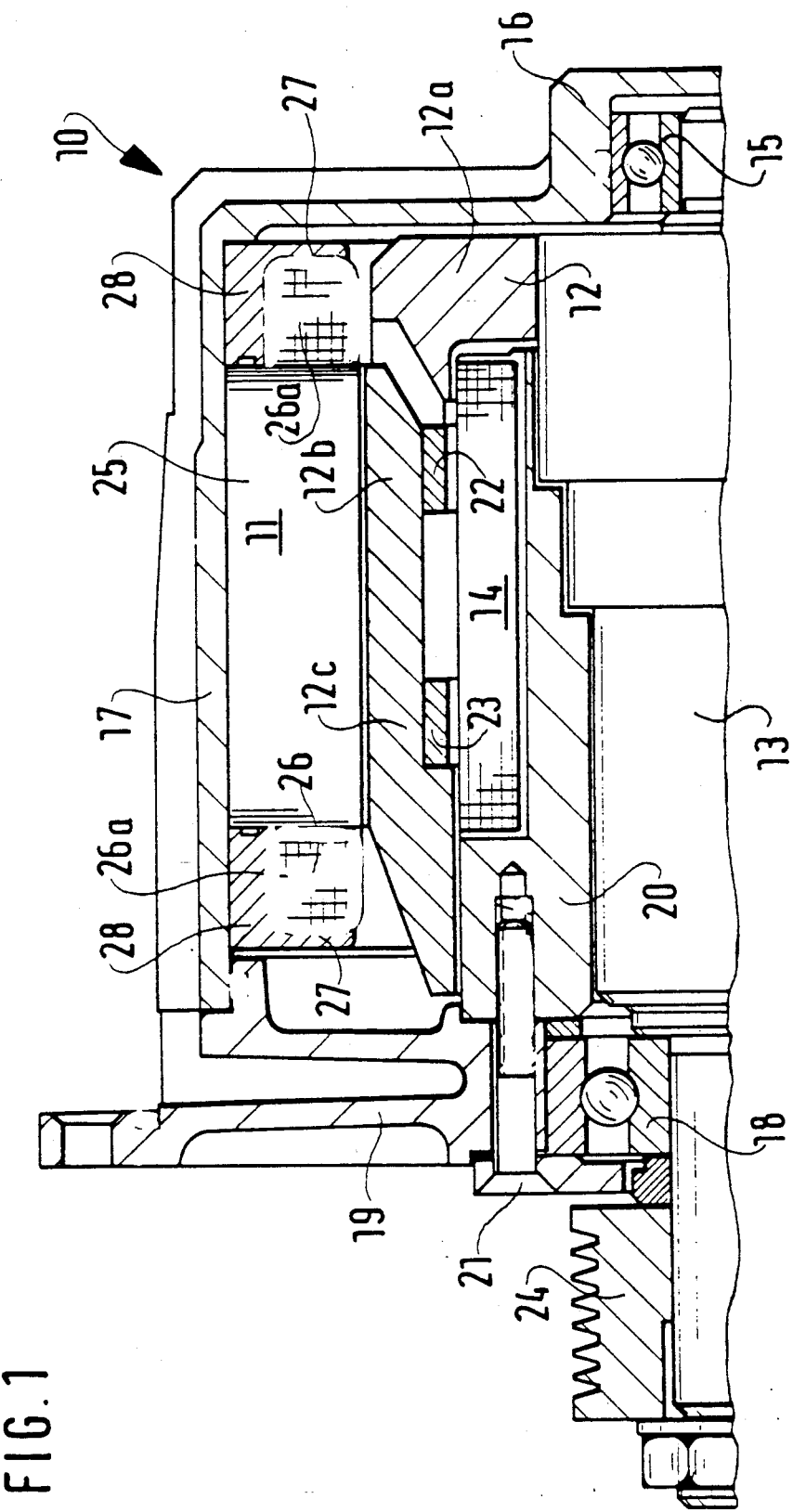
FIG. 1 is a cross sectional view showing an upper half of a rotary current generator in accordance with the present invention.

A rotary current generator shown in FIG. 1 is identified as a whole with reference numeral 10. It serves for supplying current to heavy power vehicles, construction machines and the like. The rotary current generator 10 has a standard or a stator 11, a claw pole rotor 12 composed of conductive pieces and providing claw poles, a drive shaft 13 on which the rotor 12 is mounted, and a stationary excitation winding 14.

The drive shaft 13 has a rear end which is received through a ball bearing 15 in a bearing plate 16 of a metal housing 17 of the generator. At the drive side, the drive shaft 13 is received through a further ball bearing 18 in a drive flange 19 of the generator. The drive flange 19 closes the cup-shaped metal housing 17 at the drive side. The excitation winding 14 is mounted on a magnetic flux conducting ring 20 in an insulated manner. The magnetic flux conducting ring 20 is mounted at its end on the drive flange 19 by screws 21. The drive shaft 13 extends through the magnetic flux conducting ring 20.

The rotor 12 is fitted over the drive shaft 13 and composed of magnetic conductive pieces 12a and 12b which are magnetically insulated from one another and are formed as claws. The conducting pieces 12a and 12b are connected with one another by non-magnetic holding rings 22 and 23. The drive is performed preferably from an internal combustion engine by a belt drive through a belt pulley 24 at the drive-side end of the drive shaft 13.

The stator 11 of the rotary current generator 10 includes a ring-shaped stator sheet pack 25 which is slotted at the inner side and receives a three-phase stator winding 26 in its not shown grooves. Winding heads 26a at both sides of the stator sheet pack 25 extend outwardly beyond the grooves.

For withdrawing the generated heat produced in the generator through the outer surface of the metal housing 17, the rotary current generator 10 can be inserted in a closed cooling housing. It can be mounted in the cooling housing by the drive flange 19. Cooling medium, for example cooling water, which flows through the not shown cooling housing, absorbs the generated heat.

For obtaining a good withdrawal of the generated heat from the winding heads 26a, the winding heads 26a are first completely covered by an electrical insulated layer 27 and embedded in a metal die cast alloy as a heat conductive material 28. The heat conductive material 28 is connected with the inner side of the metal housing 17 at or on a planar surface for heat withdrawal. A complete embedding of the winding heads 26a in the heat conductive material 28 is not required so that the ring shaped inner side of the winding heads 26a can be exposed.

The complete covering of winding heads 26a with the insulating layer 27 is performed in the present case with a synthetic plastic powder, which is sintered on the winding head 26a of the previously heated stator and thus produces a completely enclosed synthetic plastic coating with a thickness of approximately 1 mm. The material 28 in which the winding heads 26a are embedded must have a high heat conductive value, a low shrinkage property and a melting point lying significantly below that of copper for avoiding damage to the stator winding 26 during the die casting process. For this reason, the heat conductive material 28 is here a zinc-die cast alloy. In this present case the stator sheet pack 25 with the heat conductive material 28 on its periphery is trued to size. Then, the metal housing 17 is fitted in heated condition on the stator, so that the heat conductive material 28 is flatly connected on its outer periphery with the metal housing 17 in good heat conductive manner.

Figure 2:
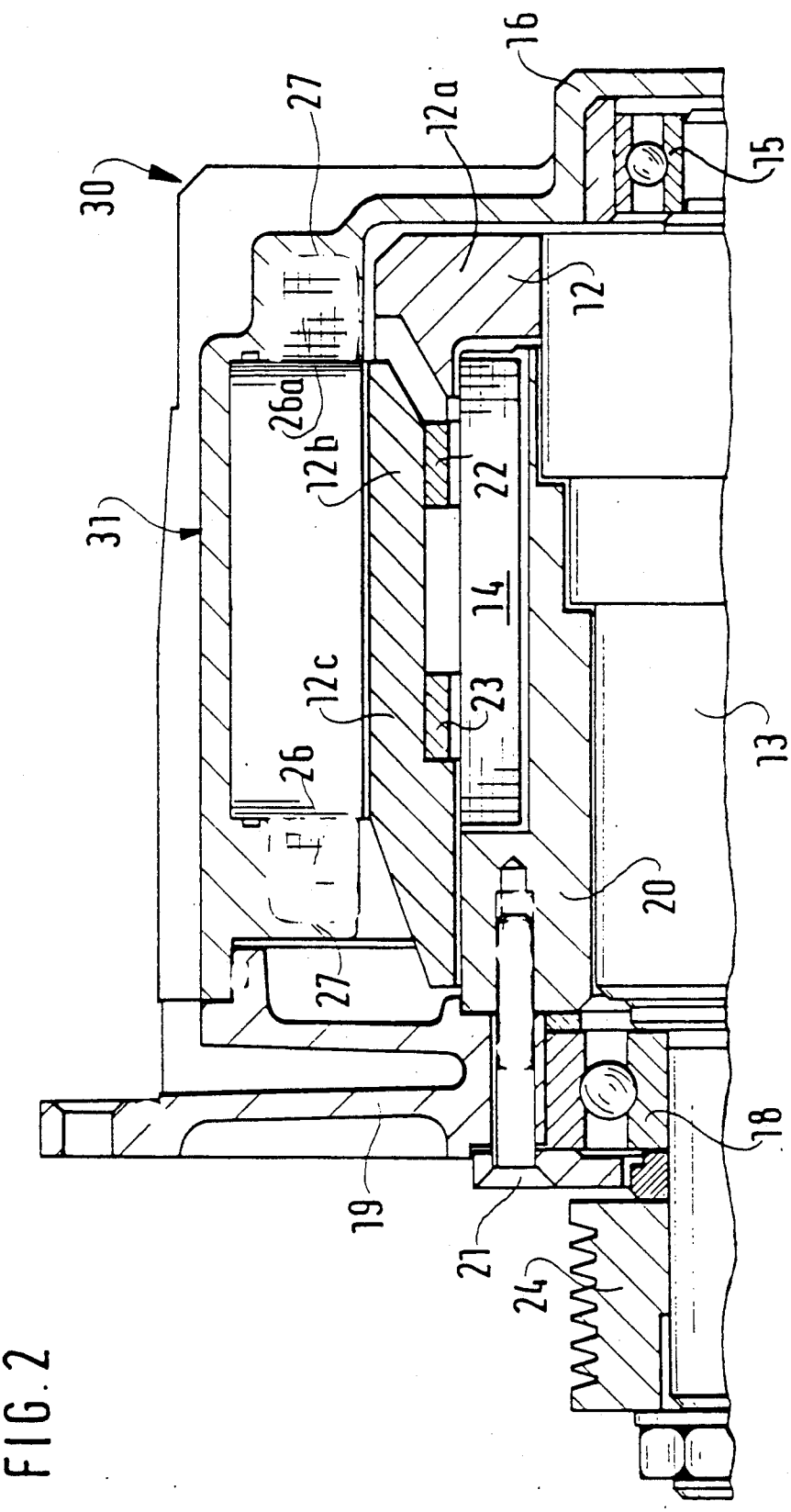
FIG. 2 is a cross sectional view substantially corresponding to the view of FIG. 1, but showing a further modification of the inventive rotary current generator.

FIG. 2 shows a second embodiment of the rotary current generator in accordance with the present invention. It is identified as a whole with reference numeral 30 and, with the exception of the metal housing, has the same construction as the rotary current generator of FIG. 1. Therefore, the same reference numerals are used for the same parts of rotary current generator of FIG. 2. In this rotary current generator the winding heads 26a are also first completely coated with an electrical insulating layer 27. In deviation from the embodiment of FIG. 1, the winding heads 26a are embedded in a heat-conductive material of a metal die cast alloy, which simultaneously forms a metal housing 31. Therefore, here the utilized material is also used as a material for the housing. In the embodiment of FIG. 2, the heat conductive material 31 is also a zinc die cast alloy, since high melting metals would damage the stator winding 26 during the casting process.

It will be understood that each of the elements described above, or two or more together, may also find a useful application in other types of constructions differing from the types described above.

While the invention has been illustrated and described as embodied in an electrical machine, such as for example rotary current generator for power vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. In an electrical machine comprising a surface-cooled stator composed of a stator sheet pack having a stator winding; a claw pole rotor; said surface-cooled stator winding having winding heads extending outwardly beyond said stator, a metal housing surrounding said stator and serving for withdrawal of generated heat from an interior to an exterior of said housing; and a heat conductive material in which said winding heads are electrically insulatingly embedded and which conducts heat to said metal housing, the improvement comprising an electrically insulating layer (27) completely covering each of said winding heads (26a) of said surface-cooled stator, and wherein said heat conductive material (28) consists essentially of a zinc die cast alloy, and said winding heads with said electrically insulating layer are embedded in said zinc die cast alloy and said heat conductive material is connected in a heat conducting manner with said metal housing (17,31).

2. The improvement as defined in claim 1, wherein said heat conductive material has a planar outer surface and said metal housing contacts on said planar outer surface so that heat transfer between said heat conductive material and said metal housing is facilitated.

3. The improvement as defined in claim 1, wherein said electrical insulating layer is composed of an impregnating resin.

4. The improvement as defined in claim 1, wherein said electrical insulating layer of said winding heads is a sintered synthetic plastic layer.

5. The improvement as defined in claim 1, wherein said heat conductive material forms said housing, so that said winding heads are coated with said electrically insulating layer and received in said metal housing of said heat conductive material.

* * * * *